US009382915B2

(12) United States Patent
Hsu et al.

(10) Patent No.: US 9,382,915 B2
(45) Date of Patent: Jul. 5, 2016

(54) CONTROL METHOD OF FAN ROTATION SPEED

(75) Inventors: Chia-Ming Hsu, Taoyuan Hsien (TW); Chien-Ming Lee, Taoyuan Hsien (TW); Yueh-Lung Huang, Taoyuan Hsien (TW); Jung-Yuan Chen, Taoyuan Hsien (TW); Ching-Sen Hsieh, Taoyuan Hsien (TW); Chia-Lin Lee, Taoyuan Hsien (TW); Yen-Hung Chen, Taoyuan Hsien (TW); Jian-Cun Lin, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 451 days.

(21) Appl. No.: 13/185,729

(22) Filed: Jul. 19, 2011

(65) Prior Publication Data

US 2012/0269652 A1 Oct. 25, 2012

(30) Foreign Application Priority Data

Apr. 21, 2011 (TW) ............... 100113847 A

(51) Int. Cl.
*F04D 27/00* (2006.01)
*F04D 19/02* (2006.01)
*F04B 49/06* (2006.01)

(52) U.S. Cl.
CPC ............ *F04D 27/004* (2013.01); *F04B 49/065* (2013.01); *F04D 19/026* (2013.01)

(58) Field of Classification Search
CPC ... F04D 19/007; F04D 19/026; F04D 19/028; F04D 19/02; F04D 27/004; F04D 27/0261; F04D 27/0269; F04B 49/065
USPC ........................ 417/2, 44.1, 44.11, 244, 423.5
See application file for complete search history.

(56) References Cited

U.S. PATENT DOCUMENTS

| | | | | |
|---|---|---|---|---|
| 6,400,045 | B1 * | 6/2002 | Hosokawa et al. | 307/117 |
| 6,643,128 | B2 * | 11/2003 | Chu et al. | 361/679.48 |
| 6,652,230 | B1 * | 11/2003 | Huang et al. | 415/198.1 |
| 6,654,894 | B2 * | 11/2003 | Kaminski et al. | 713/300 |
| 8,025,490 | B2 * | 9/2011 | Lee et al. | 417/423.5 |
| 8,212,501 | B2 * | 7/2012 | Artman et al. | 318/66 |
| 2006/0109627 | A1 * | 5/2006 | Lee | 361/695 |
| 2008/0313492 | A1 * | 12/2008 | Hansen | 714/5 |

FOREIGN PATENT DOCUMENTS

JP   2006228630 A  *  8/2006  ............. H01M 8/04

OTHER PUBLICATIONS

JP2006228630A_MT, English translation of JP2006228630 A, Author Taniguchi, Title "Cooling Control Unit of Fuel Cell System", translated May 7, 2015.*

* cited by examiner

*Primary Examiner* — Justin Jonaitis
*Assistant Examiner* — Charles Nichols
(74) *Attorney, Agent, or Firm* — Muncy, Geissler, Olds & Lowe, P.C.

(57) ABSTRACT

A control method of a fan rotation speed, which controls the operation of a fan set including fans connected in series, is disclosed. The control method includes the steps of acquiring a control factor; judging whether the control factor is less than a first threshold value; executing a first control procedure when the control factor is less than the first threshold value; judging whether the control factor is greater than a second threshold value when the control factor is greater than the first threshold; executing a second control procedure when the control factor is greater than the second threshold value; and executing a third control procedure when the control factor is less than the second threshold value.

10 Claims, 5 Drawing Sheets

CONTROL METHOD OF FAN ROTATION SPEED

CROSS REFERENCE TO RELATED APPLICATIONS

This Non-provisional application claims priority under 35 U.S.C. §119(a) on Patent Application No(s). 100113847 filed in Taiwan, Republic of China on Apr. 21, 2011, the entire contents of which are hereby incorporated by reference.

BACKGROUND OF THE INVENTION

1. Field of Invention

The present invention relates to a control method of a fan rotation speed and in particular to a control method of the fan rotation speed of a serial-connected fan set.

2. Related Art

Recently, the data process amount and speed in the electronic device are dramatically increased. Besides, the electronic device may contain more and more components due to the development of the integrated processes. Thus, the heat dissipation of the electronic device becomes more and more important. The main solution for heat dissipation is to configure a fan for increasing the air convection so as to prevent the heat accumulation in the electronic device.

The conventional fan control method is to limit the rotation speed of the fan, so that the fan can be operated under the constant voltage or wide voltage and have improved properties, thereby protecting the control circuit. When the fans are connected in series, the rotation speed of the downstream fan, which is closer to the outlet, may increase due to the effect of the upstream fan. However, the conventional fan control method of limiting the rotation speed of the fan may limit the rotation speed of the downstream fan, so that the entire properties of the serial-connected fans are impacted. Thus, the heat dissipation ability based on the conventional fan control method is decreased. Although some commercial serial-connected fans can remove the upper limitation for the rotation speed of the downstream fan, the component preparing and manufacturing become more complex and difficult. In addition, when the install direction of the serial-connected fan is reversed, the desired effect fails.

Therefore, it is one of important subjects of the present invention to provide a control method of the fan rotation speed that can control the fans in multiple modes, so that the fans can be controlled in different modes during different operation sections or environments. Thus, the serial-connected fan set can provide the maximum performance, and the control circuit can be protected from being burned out due to the excess power.

SUMMARY OF THE INVENTION

In view of the foregoing subject, an objective of the present is to provide a control method of the fan rotation speed that can control the fans in multiple modes based on the control factors.

Another objective of the present invention is to provide a control method of the fan rotation speed that can protect the control circuit from being burned out due to the excess power.

To achieve the above objectives, the invention discloses a control method of a fan rotation speed, which controls the operation of a serial-connected fan set. The control method includes the steps of: acquiring a control factor; judging whether the control factor is less than a first threshold value; executing a first control procedure when the control factor is less than the first threshold value; judging whether the control factor is greater than a second threshold value when the control factor is greater than the first threshold; executing a second control procedure when the control factor is greater than the second threshold value; and executing a third control procedure when the control factor is less than the second threshold value.

In one embodiment, the serial-connected fan set includes a first fan and a second fan structurally connected in series. The control factor can be a voltage value, a current value or a power value, and the first and second threshold values may also be voltage values, current values, or power values. The first control procedure is to remove a limitation for the rotation speed of the serial-connected fan set (including the first and second fans). In addition, the blades of the serial-connected fan set can be designed for enhancing the properties of the serial-connected fan set when the first procedure removes the limitation for the rotation speed of the serial-connected fan set. Besides, the second control procedure is to limit the power value of the serial-connected fan set, and the third control procedure is to limit the rotation speed of the serial-connected fan set.

In one embodiment, the step of acquiring the control factor is performed by reading, measurement, or calculation to obtain the control factor. When the control factor is a voltage value or a current value, it can be obtained by reading or measurement. When the control factor is a power value, it can be obtained by reading or measuring the voltage value and/or the current value, and then calculating the product of the voltage value and the current value or based on the voltage value or the current value as well as the resistance value. Moreover, the control method is carried out by a firmware or hardware, such as a logic circuit.

As mentioned above, the control method of the invention is to control the rotation speed of the serial-connected fan set in multiple modes depending on the control factor. In particular, the control method compares the control factor with the preset first threshold value (lower limit value) and second threshold value (upper limit value), and then decides to execute one of the first, second and third procedures according to the comparing result. When the acquired control fact is less than the first threshold value (less than the lower limit value), the first control procedure is executed. When the acquired control fact is greater than the second threshold value (greater than the upper limit value), the second control procedure is executed. When the acquired control fact is greater than the first threshold value and less than the second threshold value (between the lower limit value and the upper limit value), the third control procedure is executed. Accordingly, the fans can be controlled in different modes with respect to different operation sections or environments, so that the serial-connected fan set can achieve better performance, and the control circuit can be protected from being burned out due to the excess power.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
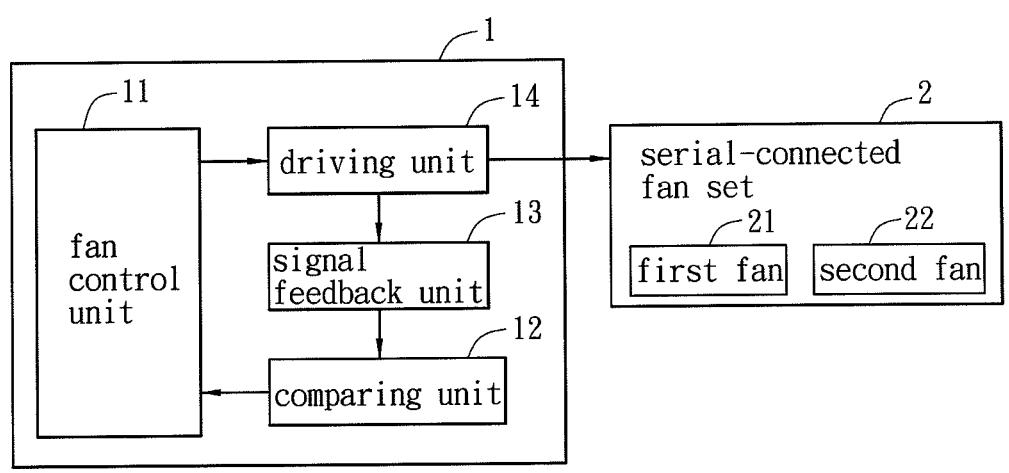
FIG. 1A is a schematic diagram showing a control module of fan rotation speed according to a preferred embodiment of the present invention.

FIG. 1A is a schematic diagram showing a control module of fan rotation speed according to a preferred embodiment of the present invention. The control method of fan rotation speed of the present invention controls the operation of a serial-connected fan set 2. The serial-connected fan set 2 includes a first fan 21 and a second fan 22. Of course, the serial-connected fan set 2 may include two or more fans, which are connected in series.

As shown in FIG. 1A, the control module 1 includes a fan control unit 11, a comparing unit 12, a signal feedback unit 13, and a driving unit 14.

The fan control unit 11 is electrically connected with the driving unit 14 and the comparing unit 12. The signal feedback unit 13 is electrically connected with the driving unit 14 and the comparing unit 12. The driving unit 14 determines the control method (modes) of the serial-connected fan set 2 according to the signal outputted from the fan control unit 11.

Figure 1B:
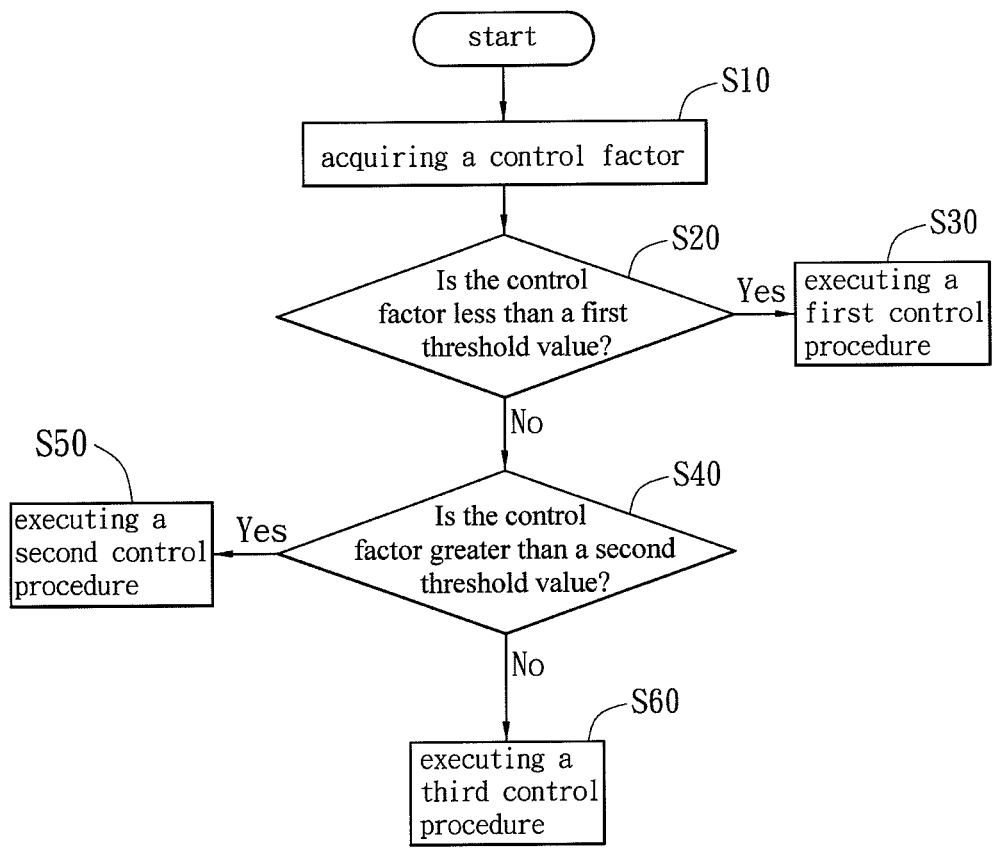
FIG. 1B is a flow chart of a control method of fan rotation speed according to the preferred embodiment of the present invention.

FIG. 1B is a flow chart of a control method of fan rotation speed according to the preferred embodiment of the present invention. Reference to both FIG. 1A and FIG. 1B, the control method includes steps S10 to S60.

Firstly, the step S10 acquires a control factor. The control factor can be obtained by reading, measurement, or calculation. In this embodiment, the control factor is, for example, a voltage value, a current value or a power value. In detailed, the control factor can be obtained by using the signal feedback unit 13 to directly read (or measure) the current value or the voltage value; otherwise, the control factor can be acquired by calculating with the current value or the voltage value to obtain the power value.

Next, the step S20 judges whether the control factor is less than a first threshold value. In this embodiment, the first threshold value is, for example, a voltage value, a current value or a power value, and it can be preset in the comparing unit 12 based on fans of different specs for reference (lower limit value). In addition, the first threshold value is set corresponding to the acquired control factor. For example, when the control factor acquired in the step S10 is a voltage value, the preset first threshold value is a voltage value. Then, the comparing unit 12 can compare the control factor with the first threshold value, and then output the comparison result to the fan control unit 11. Similarly, when the control factor acquired in the step S10 is a current value, the preset first threshold value is also a current value.

When the step S20 judges that the control factor is less than the first threshold value, the step S30 is then performed to execute a first control procedure. In details, after receiving the signal from the comparing unit 12, the fan control unit 11 outputs a corresponding control signal to the driving unit 14. Then, the driving unit 14 drives the serial-connected fan set 2 accordingly. In this case, the first procedure removes the limitation for the rotation speed of the serial-connected fan set 2 or the limitations for the rotation speeds of the first fan 21 and the second fan 22. In practice, the characteristics of the serial-connected fan set 2 can be further enhanced by cooperating the first procedure with the blade designs of the serial-connected fan set 2.

When the step S20 judges that the control factor is not less than the first threshold value, which means that the control factor is greater than the first threshold value, the step S40 is then performed to judge whether the control factor is greater than a second threshold value. In this embodiment, the second threshold value is, for example, a voltage value, a current value or a power value, and it can be preset in the comparing unit 12 based on fans of different specs for reference (upper limit value). In addition, the second threshold value is set corresponding to the acquired control factor. For example, when the control factor acquired in the step S10 is a voltage value, the preset second threshold value is a voltage value. Then, the comparing unit 12 can compare the control factor with the second threshold value, and then output the comparison result to the fan control unit 11. Similarly, when the control factor acquired in the step S10 is a current value, the preset second threshold value is also a current value.

When the step S40 judges that the control factor is greater than the second threshold value, the step S50 is then performed to execute a second control procedure. In details, after receiving the signal from the comparing unit 12, the fan control unit 11 outputs a corresponding control signal to the driving unit 14. Then, the driving unit 14 drives the serial-connected fan set 2 accordingly. In this case, the second procedure is to limit the power value of the serial-connected fan set (or the power values of the first fan 21 and the second fan 22). To be noted, the rising voltage may increase the rotation speed of the fan under the wide voltage, the power consumption is also increased. Thus, the second procedure can limit the power value so as to maintain the power consumption of the fan under a critical limitation. This can not only protect the circuit board and the system, but also prevent the damages of the system and the circuit board caused by the excess power.

When the step S40 judges that the control factor is not greater than the second threshold value, the step S60 is then performed to execute a third control procedure. In details, after receiving the signal from the comparing unit 12, the fan control unit 11 outputs a corresponding control signal to the driving unit 14. Then, the driving unit 14 drives the serial-connected fan set 2 accordingly. In this case, the third procedure is to limit the rotation speed of the serial-connected fan set 2 (or the rotation speeds of the first fan 21 and the second fan 22). This configuration can set the maximum rotation speeds for the first fan 21 and the second fan 22, so the characteristics thereof during the operation section are obviously superior to those of the conventional designs.

To be noted, the control method of the present embodiment can be carried out by firmware or hardware such as a logic circuit. For example, the fan control unit 11 can be a chip that can execute the control method. Accordingly, after receiving the comparison result from the comparing unit 12, the fan control unit 11 can control the serial-connected fan set 2 to execute the corresponding procedure. This can achieve the multiple mode control.

As mentioned above, in one embodiment of the present invention, the signal feedback unit 13 can directly read (or measure) the current or voltage value and then calculate the corresponding power value, which is used as the control factor. The comparing unit 12 includes the preset first and second threshold values, which are both power values. When the serial-connected fan set 2 is enabled, the fan control unit 11 can dynamically output an output signal to the driving unit 14 depending on the variation of the control factor. Then, the driving unit 14 can control the serial-connected fan set 2 to execute corresponding procedure, so that the fans in the serial-connected fan set 2 can respectively achieve their optimum performances.

Figure 2A:
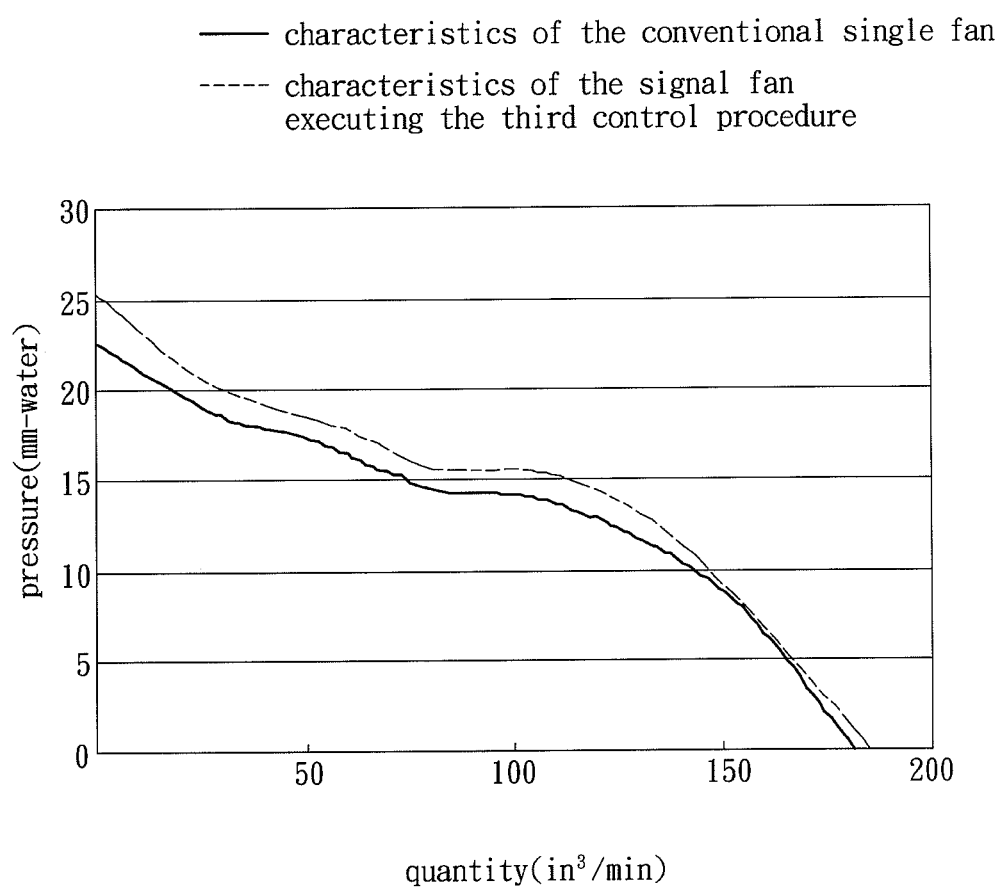
FIG. 2A is a comparison graph showing the comparison results of the pressure-quantity characteristics of the conventional single fan and the signal fan (executing the third control procedure) according to the preferred embodiment of the present invention.

FIG. 2A is a comparison graph showing the comparison results of the pressure-quantity characteristics of the conventional single fan and the signal fan (executing the third control procedure) according to the preferred embodiment of the present invention. In this case, the control method of the present invention can limit the maximum rotation speeds of the first fan 21 and the second fan 22 during the operation section. As shown in FIG. 2A, the characteristics of the signal fan with executing the third control procedure of the present invention is obviously superior to those of the conventional single fan.

Figure 2B:
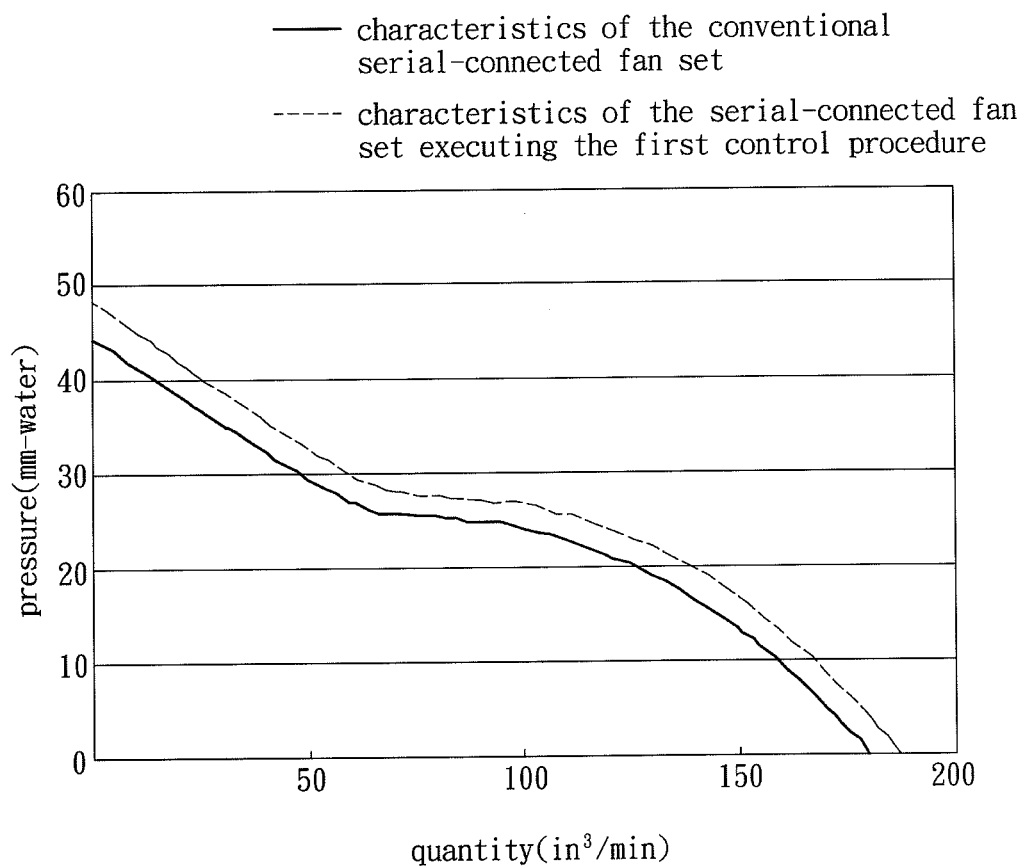
FIG. 2B is a comparison graph showing the comparison results of the pressure-quantity characteristics of the conventional serial-connected fan set and the serial-connected fan set (executing the first control procedure) according to the preferred embodiment of the present invention.

FIG. 2B is a comparison graph showing the comparison results of the pressure-quantity characteristics of the conventional serial-connected fan set and the serial-connected fan set (executing the first control procedure) according to the preferred embodiment of the present invention. In this case, the control method of the present invention can remove the limitations for the rotation speeds of the first fan 21 and the second fan 22 during the operation section. As shown in FIG. 2B, when cooperating with the blade designs of the serial-connected fan set 2, the characteristics of the serial-connected fan set 2 can be sufficiently enhanced.

Figure 2C:
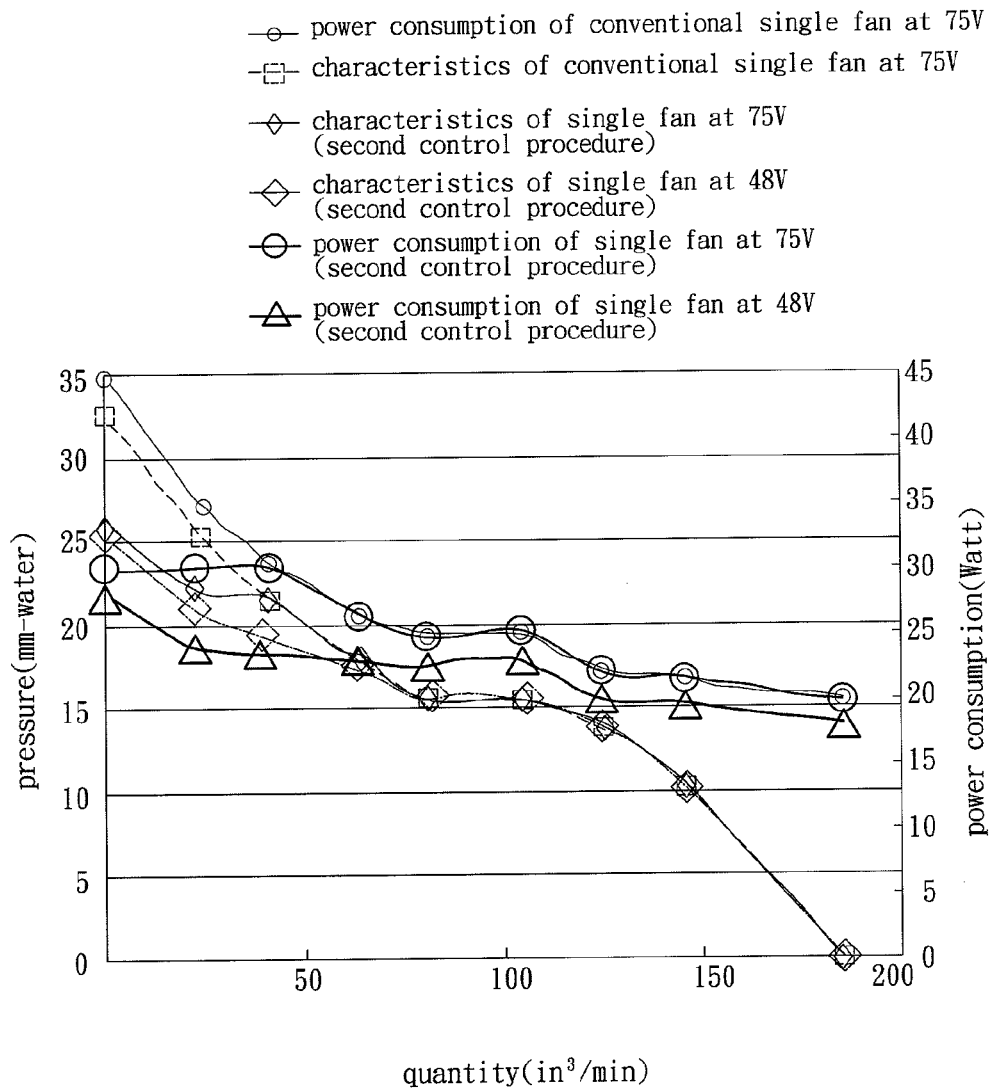
FIG. 2C is a comparison graph showing the comparison results of the pressure-quantity characteristics and power consumptions of the conventional single fan with wide voltage and the single fan with wide voltage (executing the second control procedure) according to the preferred embodiment of the present invention.

FIG. 2C is a comparison graph showing the comparison results of the pressure-quantity characteristics and power consumptions of the conventional single fan with wide voltage and the single fan with wide voltage (executing the second control procedure) according to the preferred embodiment of the present invention. When the voltage is at, for example, 48V and 75V, the power values of the first fan 21 and the second fan 22 are limited. As shown in FIG. 2C, the comparison results show that the characteristics of the present invention are obviously superior to those of the conventional single fan. The power consumption of the conventional single fan increases from 20 Watts to 45 Watts, and the power consumption of the present invention increases from 20 Watts to 30 Watts only. This comparison result shows that the second procedure of the present invention can prevent the damage of the system or fan caused by the excess power consumption.

To sum up, the control method of the invention is to control the rotation speed of the serial-connected fan set in multiple modes depending on the control factor. In particular, the control method compares the control factor with the preset first threshold value (lower limit value) and second threshold value (upper limit value), and then decides to execute one of the first, second and third procedures according to the comparing result. When the acquired control fact is less than the first threshold value (less than the lower limit value), the first control procedure is executed. When the acquired control fact is greater than the second threshold value (greater than the upper limit value), the second control procedure is executed. When the acquired control fact is greater than the first threshold value and less than the second threshold value (between the lower limit value and the upper limit value), the third control procedure is executed. Accordingly, the fans can be controlled in different modes with respect to different operation sections or environments, so that the serial-connected fan set can achieve better performance, and the control circuit can be protected from being burned out due to the excess power.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A control method of a fan rotation speed, which controls the operation of a serial-connected fan set, comprising steps of:
   acquiring a control factor;
   judging whether the control factor is less than a first threshold value;
   executing a first control procedure, when the control factor is less than the first threshold value, wherein a rotation speed of the serial-connected fan set is not limited when the first control procedure is executed;
   judging whether the control factor is greater than a second threshold value when the control factor is greater than the first threshold;
   executing a second control procedure, when the control factor is greater than the second threshold value, wherein the second control procedure is to limit a power value of the serial-connected fan set; and
   executing a third control procedure, when the control factor is less than the second threshold value, wherein the third control procedure is to limit the rotation speed of the serial-connected fan set,
   wherein the control factor is a voltage value, a current value or the power value, and the step of acquiring the control factor is performed by reading, measurement, or calculation to obtain the control factor.

2. The control method of claim 1, wherein the serial-connected fan set includes a first fan and a second fan structurally connected in series.

3. The control method of claim 2, wherein the first threshold value and the second threshold value are voltage values, current values, or power values.

4. The control method of claim 2, wherein the blades of the first fan and the second fan are designed for enhancing the properties of the serial-connected fan set when the first procedure removes the limitation for the rotation speed of the serial-connected fan set.

5. The control method of claim 2, wherein the control method is carried out by a firmware or hardware, or the hardware is a logic circuit.

6. The control method of claim 1, wherein the first threshold value and the second threshold value are voltage values, current values, or power values.

7. The control method of claim 1, wherein the first threshold value is a lower limit value, and the second threshold value is an upper limit value.

8. The control method of claim 1, wherein the blades of the serial-connected fan set are designed for enhancing the properties of the serial-connected fan set when the first procedure removes the limitation for the rotation speed of the serial-connected fan set.

9. The control method of claim 1, wherein the control method is carried out by a firmware or hardware, or the hardware is a logic circuit.

10. A control method of a fan rotation speed, which controls the operation of a serial-connected fan set, comprising steps of:
- acquiring a control factor;
- judging whether the control factor is less than a first threshold value;
- executing a first control procedure, when the control factor is less than the first threshold value, wherein the serial-connected fan set includes at least a first fan and a second fan, and that a rotation speed of the first fan and the second fan is not limited when the first control procedure is executed;
- judging whether the control factor is greater than a second threshold value when the control factor is greater than the first threshold;
- executing a second control procedure, when the control factor is greater than the second threshold value, wherein the second control procedure is to limit a power value of the serial-connected fan set; and
- executing a third control procedure, when the control factor is less than the second threshold value, wherein the third control procedure is to limit the rotation speed of the serial-connected fan set,
- wherein the control factor is a voltage value, a current value or the power value, and the step of acquiring the control factor is performed by reading, measurement, or calculation to obtain the control factor.

* * * * *